INVENTOR
Hobart Beresford
Edgar V. Collins
BY Rudolph L. Lowell ATTY.

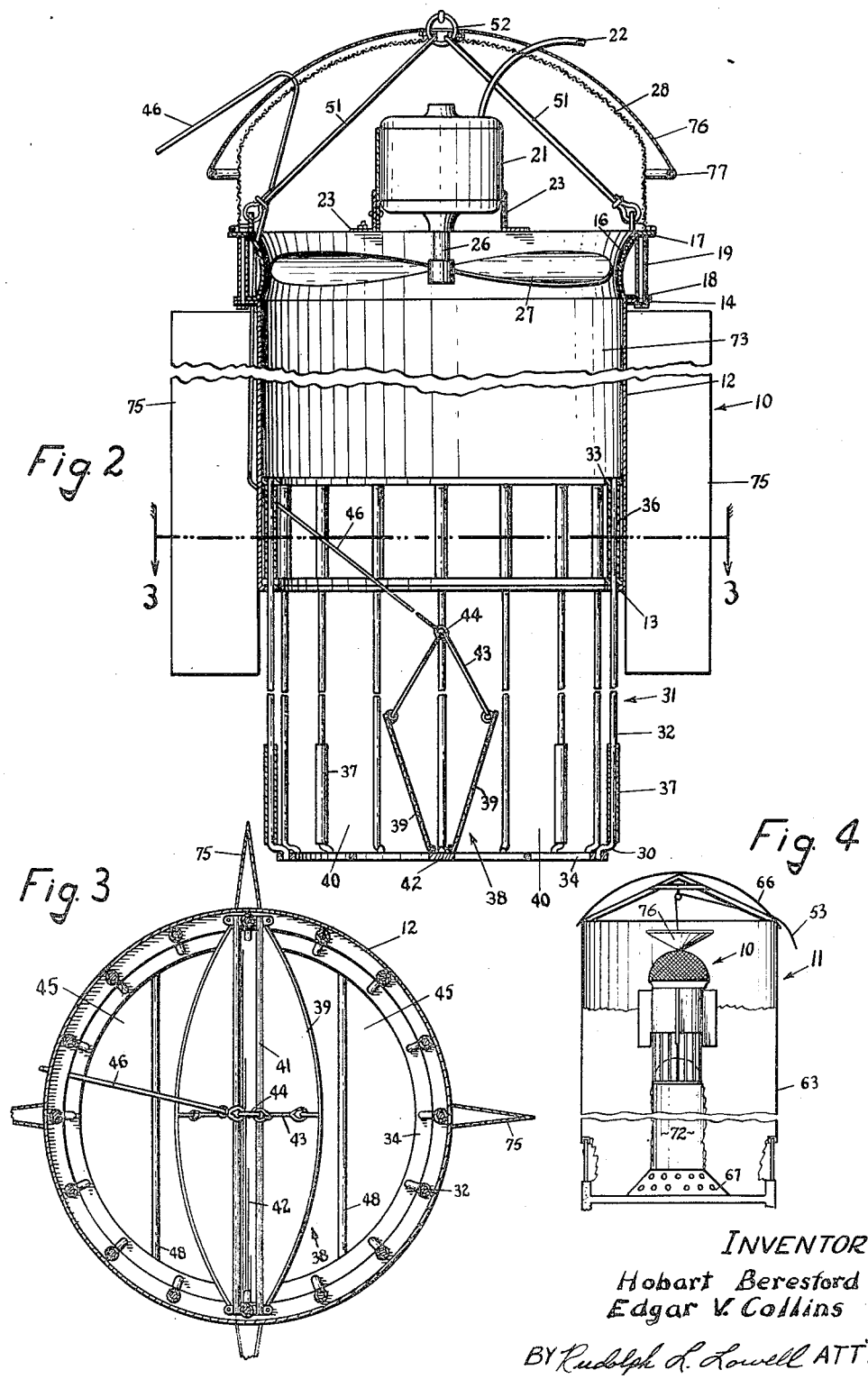

United States Patent Office 2,765,542
Patented Oct. 9, 1956

---

2,765,542

APPARATUS FOR DRYING STALK FARM CROPS

Edgar V. Collins and Hobart Beresford, Ames, Iowa

Application April 20, 1953, Serial No. 349,812

5 Claims. (Cl. 34—229)

This invention relates generally to apparatus for drying stalk or vine-like farm forage and more particularly to a method and apparatus for drying such crops concurrently with the stacking thereof for storage purposes.

The desirability of artificially, rather than field drying farm crops of the stalk or vine-like class, such as hay, before such crops are stored is well known. The hay can be stored immediately after cutting to prevent its being damaged by wet weather. Also by moving the hay from the field to a storage bin while the hay is green and tough, no loss of leaves results from the handling of the hay, as is the case when the hay is moved after field drying. In addition, it has been found that artificially dried hay has up to twice the food value of field dried hay.

An object of this invention is to provide an improved method and apparatus for drying stalk and vine-like crops concurrently with the stacking of such crop for storage.

A further object of this invention is to provide apparatus for forming a central air passage in hay being stacked concurrently with drawing air through the stacked hay and into the passage to dry the hay.

Another object of this invention is to provide a drying unit which is mounted for up and down movement in a hay storage structure as the hay is being stored, whereby to form a vertical air passage in the hay through which the unit operates to move air through the hay in the storage structure.

A further object of this invention is to provide a drying unit for hay and the like having means for regulating the relative amounts of air moved through different sections of the hay being dried.

A still further object of this invention is to provide a drying unit which is rugged in construction, economical to manufacture and efficient in operation to dry farm crops such as hay and the like concurrently with the stacking thereof for storage.

Further objects, features and advantages of this invention will become apparent from a consideration of the following description when taken in connection with the accompanying drawing in which:

Fig. 2 is an enlarged longitudinal sectional view of the drying unit of this invention;

Fig. 3 is a transverse sectional view as seen along the line 3—3 in Fig. 2; and

Fig. 4 is a diagrammatic longitudinal sectional view of a crop storage structure, shown partially filled with hay and having the drying unit of this invention mounted therein.

Figure 1:
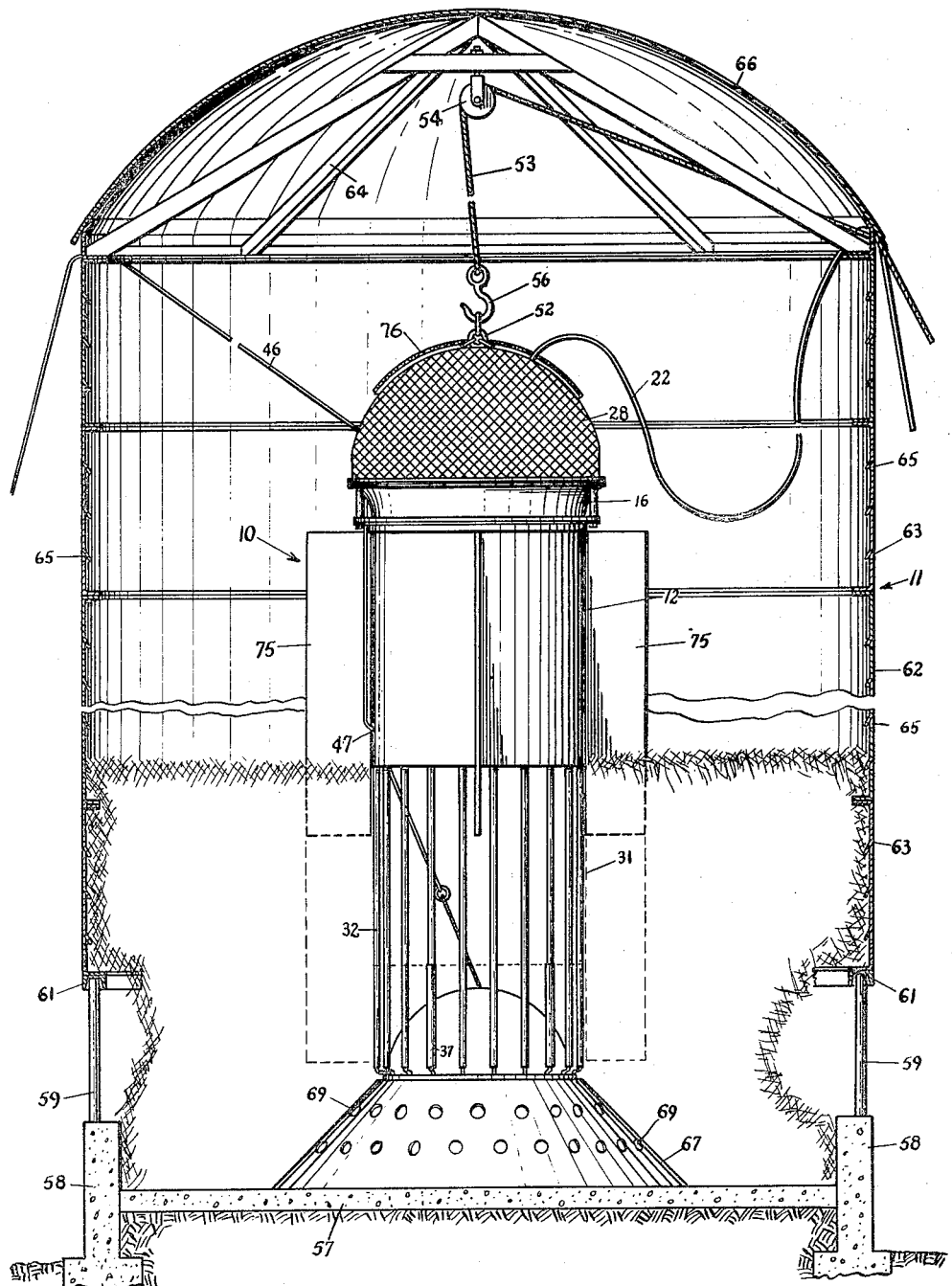
Fig. 1 is an elevational view of the drying unit of this invention shown in assembly relation with a crop storage structure, with some parts being broken away and other parts shown in section for the purpose of clarity.

With reference to the drawing, the drying unit of this invention indicated generally as 10 in Fig. 1 is shown in an upright storage structure or bin 11 in which a stalk or vine-like farm crop such as hay is to be stored. The drying unit 10 (Figs. 1 and 2) includes an upright tubular casing or body member 12 formed at its lower end with an inwardly directed peripheral flange 13 and at its upper end with an outwardly directed peripheral flange 14. Supported on the flange 14 and extended upwardly in an axially aligned relation with the body member 12, is a fan casing or shell 16 having an inner diameter at its lower end corresponding to the diameter of the body member 12. The fan casing 16 has its inner peripheral surface curved upwardly and outwardly from the top end of the body member 12 and constitutes a combination fan support and air directing member. The casing 16 is formed at its upper and lower ends, respectively, with outwardly directed peripheral flanges 17 and 18 and is secured to the peripheral flange 14 formed at the upper end of the body member 12 by means of vertical connecting members 19 extended through the flanges 14, 17 and 18.

An electric motor 21, provided with a usual electrical plug-in cord 22, is suitably mounted on a pair of laterally spaced angle members 23 extended across the casing member 16 and secured at their ends to the peripheral flange 17 formed at the top end of the casing or support member 16. The motor 21 is mounted with the drive shaft 26 thereof upright and extended downwardly from the lower end of the motor to a position within the fan casing 16. Mounted on the lower or extended end of the drive shaft 26, is a fan member 27 arranged within the vertical confines of the fan casing 16 and of a diameter slightly less than the diameter of the fan casing 16.

The fan 27 is constructed so that when rotated by the motor 21, air is drawn in through the lower end of the body member 12 and discharged outwardly through the top end of the casing 16. For keeping hay and the like out of the unit 10 during filling of the storage structure 11, a perforated hood or screen member 28, is provided at the upper end of the casing 16 in an enclosing relation with the motor 21. The screen 28 is of a substantially dome shape and is secured at its lower end to the top flange 17 on the casing member 16.

A generally cone shaped canvas hood or cover 76 (Fig. 2) is arranged on the top side of the screen member 28 and attached at its center to a central mounting ring 52 on the screen 28 for preventing the openings in the screen member 28 from becoming clogged with hay during filling of the structure 11 when the fan 27 is shut off. A metal ring 27, secured about the lower end of the canvas cover 76 functions as a weight to hold the lower end of the cover 76 in a position overlying the top side of the screen member 28.

To provide for at least a portion of the air moved through the unit 10 by the fan 27 being drawn laterally through hay surrounding the unit 10, an upright tubular and open frame structure 31 is provided at the lower end of the body member 12 (Figs. 2 and 3). The frame structure 31 includes a series of spaced apart upright rods or bars 32 arranged in a circle having a diameter slightly less than the diameter of the body member 12. The rods 32 extend upwardly through the inwardly directed peripheral flange 13 formed at the bottom end of the body member 12, and are secured at their upper ends to an upper ring member 33 slidably positioned within and in a guided engagement with the inner peripheral surface of the body member 12. Loosely mounted about each rod 32 at a position between the ring member 33 and the flange 13 is a tubular spacing sleeve or collar 36. These sleeves 36 are supported on the flange 13 and have their upper ends engageable with the upper ring member 33 to limit the movement of the rods 32 downwardly through the tubular member 12.

The lower ends of the rods 32 are bent inwardly and downwardly for connection, as by welding, of their terminal end portions 30 to a lower annular ring member 34. A spacing sleeve or collar 37 is loosely mounted about each rod 32, at a position between the terminal end portion 30 and the flange 13, so as to rest on the end portion 30 and have its upper end engageable with the underside of the flange 13 to limit the upward movement of the rods 32 relative to the body member 12. It is seen, therefore, that the rods 32 and upper and lower rings 33 and 34, respectively, form what might be termed a wire basket open at both ends.

For adjustably closing the lower end of the frame or basket unit 31 there is provided a circular damper unit 38 having a pair of substantially semi-circular damper plates 39 connected along their straight edges, by hinges 41 (Figs. 2 and 3), to opposite sides of a central supporting bar 42 extended diametrically across, and secured at its ends to, the lower ring member 34. The damper plates 39 are of a size, when arranged in a horizontal or closed position, to close the lower end of the frame unit 31, and are supported in this position on a pair of rods 48 secured at their ends to the lower ring 34 and arranged in a parallel relation with and on opposite sides of the central supporting bar 42.

A wire or cord 43, of a length corresponding substantially to the diameter of the damper unit 38, has its ends secured to the free ends of the damper plates 39. The cord 43 carries a ring 44 to which is connected one end of an operating wire 46 that is loosely extended through an opening 47 formed in the side of the body member 12 below the sliding or upper ring 33. From the opening 47 the wire 46 extends upwardly along the outside of the body member 12, and through the supporting member or fan casing 16 and the screen 28. It is apparent, that by pulling on or releasing the operating wire 46, the free end of which can be positioned outside the storage structure 11, the damper plates 39 are moved up and down about the hinges 41. With the damper unit 38 in a closed position, air is drawn into the unit 10 by the fan 27 through the spaces 40 between the rods 32, so that such spaces 40 constitute lateral or side air inlets for the unit 10. Also, when the damper unit 38 is partially or fully opened longitudinal or end air inlets are provided by the spaces 45 at opposite sides of the damper supporting bar 42. These spaces or longitudinal air inlets 45 are adjustably opened and closed by manipulation of the operating wire 46 so as to relatively regulate the amounts of air drawn inwardly through the side openings 40 and upwardly through the end openings 45.

In use, the drying unit 10, is suspended in an upright position substantially centrally of the storage structure 11. For this purpose, supporting cables or wires 51 are secured at their lower ends to the fan casing or support member 16 and at their upper ends to a ring 52 extended through the central upper portion of the screen hood 28. A rope or cable 53 connected at one end by a hook 56 to the ring 52 is passed around a pulley 54 which is suitably supported from an overhead or roof structure 64 for the storage structure 11. The other end of the cable 53 is positioned outwardly of the storage structure 11 to provide for the manipulation of the cable to raise and lower the unit 10 in the structure 11.

The structure 11 may be of any suitable type having perforated side walls, or a wire mesh side wall and is illustrated in Fig. 1 as including a concrete base 57 formed with an annular upright supporting wall 58. Upright spaced rods 59 on the wall 58 define feeding stalls (not shown) and carry at their upper ends an annular supporting ring 61. Curved metal sections 62, having perforations 65, are arranged in circular tiers on the supporting ring 61 and form the side wall 63 of the structure 11, with the roof frame structure 64 being carried on the upper end of the side wall 63. A roof member 66 is indicated as being supported on the roof frame structure 64.

When the structure 11 is to be filled with hay, the unit 10 is initially positioned with the lower end of the basket unit 31 in resting engagement on the upper end of a hollow and perforated truncated hay directing cone 67 which is supported in a substantially central position on the base 57 of the structure 11. The damper unit 38 is then opened so as to open the lower end of the basket unit 31 relative to the upper end of the cone 67. With the unit 10 supported on the cone 67, the lower flange 13 of the body member 12 is supported on the top ends of the sleeves 37 so that the portions of the rods 32 above the sleeves 37 are disposed within the body member 12. As a result the height of the lateral or side air inlets 40, formed between the rods 32, corresponds substantially to the height of the sleeves 37.

On the dropping of hay into the structure 11 through an opening (not shown) formed in the roof 66 such hay falls on the base 57 about the cone 67 and the unit 10 so as to stack itself between the unit 10 and the side wall of the structure 11.

The fan 27 operates to draw air laterally through the hay stacked about the unit 10, with this air passing into the hay either through the top side of the stacked hay or through the perforations 65 in the structure 11 and the open feed stalls formed by the bars 59. After flowing through the hay, the air travels through the perforations 69 in the cone 67 and the lateral air inlets 40 into the body member 12 for discharge through the hood 28 outwardly into the structure 11 above the stacked hay.

As best appears in Fig. 4, during operation of the fan 27, air is forced upwardly through the screen member 28 to move the cover 76 upwardly out of an enclosing relation with the screen member 28. The air discharged from the fan 27 continually supports the cover 76 above the screen member 28, with the cover 76 in this supported position being in the shape of an inverted cone by virtue of its central connection to the ring 52. When the fan 27 is shut off the cover 76 automatically returns to its position on the top side of the screen member 28 as a result of the weight of the metal ring 77 on the lower end of the cover 76.

Concurrently with the drying of the hay thus stacked, hay is continually loaded into the structure 11, about the unit 10. When the stacked hay reaches the upper end of the tubular member 12, the cable 53 is manipulated to move the member 12 upwardly relative to the basket unit 31, to increase the size or height of the air inlets 40. Drying air is thus drawn through the hay as it is being stacked. This movement of the body member 12 relative to the basket or frame structure 31 is continued as required by the hay stacking operation, until the sleeves 36, which rest on the flange 13, contact the upper ring 33. The height of the lateral air inlets 40 have then been increased to a maximum so that upon further upward movement of the body member 12, the frame structure 31 is concurrently moved upwardly therewith. In other words, the entire drying unit 10 is moved upwardly in the structure 11 on a continued pulling of the cable 53.

The drying unit 10 is then progressively moved upwardly in the structure 11, each time the hay being stacked in the structure 11 reaches the upper end of the body member 12, until the structure 11 is filled. As previously mentioned the hay filled within the structure 11 stacks itself about the drying unit 10 and against the structure wall 63. By virtue of this stacking action, when the unit 10 is raised from the cone support 67, there is left in the wake or below the unit 10 an air chamber or space 72 (Fig. 4) of a diameter equal to that of the tubular member 12 and of a height corresponding to the raised movement of the unit 10 from the cone 67. This air chamber 72 constitutes an extension of an air passage 73, within the tubular member 12, so as to form with the passage 73 a continuous air passage from the fan 27 to the cone 67, and through the cone 67 to the base or foundation 57 of the storage structure 11. It will be further apparent that the air chamber or air passage extension 72, is progressively increased in length with an increase in the distance which the drying unit 10 is lifted or raised from the cone 67.

The function of the unit 10 to form the air passage 72 takes place concurrently with a drying of the hay, about and below the frame structure 31. As a result when the structure 11 has been filled with hay and the drying unit 10 is positioned adjacent the roof 66 of the structure 11, a continuous vertical air passage 72 and 73 has been formed in the hay. It will be understood that when the tubular member 12 and frame or basket structure 31 are raised as a unit, the size of the lateral or air inlets 40 is fixed. However, the damper unit 38 may be regulated to control the size of the longitudinal or end air inlets 45 so that the air drawn into the tubular member 12 may be varied for travel inwardly through the hay stacked about the inlets 40 alone, or through both the hay about the inlets 40 and the hay about the vertical air passage 72 depending upon the moisture condition of the hay being dried. The air drawn laterally through the hay about the air passage 72 enters the passage 72 for flow upwardly therethrough and into the unit 10 through the air inlet 45. Further, when the structure 11 has been filled the fan 27 may be maintained in operation and the damper unit 38 regulated to provide any desired dried condition of the stacked hay.

The hay, which may be in chopped form when delivered to the storage structure 11, may have an initial relative humidity of about thirty-five percent (35%). To be satisfactory for long time storage purposes, this hay must be dried to a relative humidity of about 15%. Therefore, the hay which has been subjected to drying air drawn therethrough by the unit 10 may be continually tested to determine its moisture content during filling of the structure 11, or after such filling has been completed. If necessary, the drying unit 10 may be lowered in the air passage 72 to further dry the hay adjacent the bottom end of the structure 11.

In the use of the cured or dried hay for feeding purposes, animals such as cattle, feed on the hay directly through the spaces or feed stalls (not shown) provided between the bars 59. As hay is fed or removed, hay within the structure 11 progressively falls or drops so as to be continuously available to the cattle at the feed stalls, namely, the hay is self-feeding. The cone 67 facilitates this self-feeding action of the hay, by directing the hay, as it drops, toward the feed stalls. To complement the directing function of the cone 67 the tubular member 12 is provided with a series of vanes or wings 75, illustrated as four in number, arranged ninety degrees apart and extended upright over the full length of the member 12. Also, the wings 75 project radially from the member 12 a distance equal to about one-third of the diameter of the member 12.

Thus as the hay is stacked about the member 12, during a filling operation, the hay within the radial confines of the wings 75 is divided or split along the wings 75, and with such divisions or splits extending over the full vertical height of the stacked hay, as a result of the upward movement of the member 12, during a hay filling operation, in the manner previously described.

As a result of this division or separation of the hay, stacked directly about the member 12, as such hay moves downwardly on the cone 67, it is permitted to separate from the adjacent hay segments or divisions formed by the wings 75 whereby to eliminate any accumulations or arching of hay at the bottom center of the structure 11. In other words the hay is prevented from becoming entangled at the cone 67 so as to be readily pulled toward the feeding stalls, or the support wall 58 by the feeding cattle. It will be appreciated also that arching of the hay within the structure 11 is substantially eliminated by the air passage 72 being formed by the stacked hay, rather than by a tunnel or passage structure initially placed within the storage structure 11.

In one embodiment of the invention the member 12 has a length of four feet and a diameter of three feet and the frame or basket structure 31 an extended length of three feet from the member 12. In this embodiment the motor 21 is of five horse power with the fan 27 having three foot blades.

It is to be understood, of course, that although the method and apparatus of this invention have been described as having the fan 27 operated so as to move air upwardly through the unit 10, equally advantageous results are obtained by operating the fan 27 so as to force air downwardly in the unit 10 and outwardly through the air openings 40 and 45 into the stacked hay to dry the hay.

From the above description it can be seen that the method and apparatus of this invention provides for the efficient drying of a stalk or vine like farm crop such as hay concurrently with the stacking thereof in a storage structure. By virtue of the construction of the drying unit 10 with the lateral air inlets 40 and the longitudinal air inlets 45, all of the hay in the storage structure 11 is dried, while the structure 11 is being filled with hay, sufficiently to permit a safe storage of the hay. Further, the self-forming of the air passage 72, in conjunction with the action of the cone 67 and wings 75 substantially eliminates any arching or entangling of the hay so as to provide for the hay being self-fed about the lower end of the storage structure 11.

Although the invention has been described with respect to a preferred embodiment thereof, it is to be understood that it is not to be so limited since changes can be made therein which are within the full intended scope of the appended claims.

We claim:

1. For use in the drying of stalk farm crops concurrently with the stacking of such crops, a drying unit to be disposed within a stack being formed and comprising an upright longitudinally extended hollow body member, blower means mounted on said body member for moving air longitudinally through said body member, a frame structure mounted on said body member and projected downwardly from the bottom end thereof, said frame structure having air openings in the side wall and lower end wall thereof, damper means extended across the lower end of said frame structure to regulate the flow of air therethrough, and means for progressively moving the unit upwardly as the stack is formed about the unit so that air moved through said body member and frame structure is moved through said openings and the stacked crop.

2. For use in the drying of stalk farm crops concurrently with the stacking thereof, a drying unit adapted to be disposed in and moved upwardly through a stack as the stack is being formed, said unit comprising a tubular casing, air moving means on said casing for moving air through the casing, a frame structure supported in a telescoping relation on said tubular casing, for extension and retraction relative to the lower end of said casing, with said frame structure having lateral and longitudinal air openings for the air moved through the casing by said air moving means, and means on said frame structure for regulating the relative amounts of air moved through said lateral and longitudinal air openings.

3. Apparatus providing for the self-feeding of a stacked crop within a storage structure wherein feeding stalls are formed in the side wall of the structure about the lower end thereof, said apparatus comprising a hollow perforated truncated cone member adapted to be substantially centrally arranged at the bottom of the storage structure so as to direct the lower portion of the stacked crop toward said feeding stalls, an upright tubular passage forming unit mounted for vertical movement in said structure between the upper end of said cone and the upper end of said structure during the stacking of the crop into the structure so as to form a continuous upright passage in the formed stack having a self supported side wall, upright wing members secured to and projected radially from said passage forming unit for splitting the stack as the same is formed into sections arranged between adjacent ones of said wing members, whereby as the stack moves downwardly in the structure said split sections on movement downwardly on said cone member are separated and moved toward said feeding stalls.

4. For use in the drying of stalk farm crops concurrently with the stacking thereof, a unit adapted to be disposed in and moved upwardly through a stack as the stack is being formed so as to form an upright tubular air passage in the formed stack, said unit comprising an imperforate upright tubular casing, means for moving air through said casing and a frame structure supported in a telescoping relation on said tubular casing for extension and retraction relative to the lower end of said casing, with said frame structure having openings formed therein at positions providing for the movement of air longitudinally and laterally of said frame structure.

5. Apparatus providing for the self feeding of a stacked crop within a storage structure wherein feeding stalls are formed in the side wall of the structure about the lower end thereof, said apparatus comprising a feed directing unit positioned within said storage structure at the lower end thereof, and having downwardly and outwardly inclined walls, an upright tubular casing mounted for up and down movement in said structure between the upper end of the feed directing unit and the upper end of the structure during the stacking of a crop within the structure, wing members on said casing extended radially therefrom for splitting the stack into sections during the forming thereof, and air moving means for moving air through said casing.

References Cited in the file of this patent

UNITED STATES PATENTS

| | | |
|---|---|---|
| 32,584 | Post | June 18, 1861 |
| 842,538 | Elward | Jan. 29, 1907 |
| 1,317,309 | Overholt | Sept. 30, 1919 |
| 2,601,728 | Erfurth | July 1, 1952 |
| 2,645,991 | Hobson | July 21, 1953 |
| 2,655,734 | Ohlheiser | Oct. 20, 1953 |
| 2,656,783 | Heal | Oct. 27, 1953 |

FOREIGN PATENTS

| | | |
|---|---|---|
| 485,750 | France | Nov. 12, 1917 |